(12) United States Patent
Daidone et al.

(10) Patent No.: US 8,781,090 B2
(45) Date of Patent: Jul. 15, 2014

(54) SYSTEM AND METHOD FOR IDENTIFYING BILLING ERRORS

(71) Applicant: Goldman, Sachs & Co., New York, NY (US)

(72) Inventors: Karen M. Daidone, Cos Cob, CT (US); James S. Slusarz, Brooklyn, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/681,540

(22) Filed: Nov. 20, 2012

(65) Prior Publication Data

US 2013/0195263 A1 Aug. 1, 2013

Related U.S. Application Data

(63) Continuation of application No. 12/638,869, filed on Dec. 15, 2009, now Pat. No. 8,320,538, which is a continuation of application No. 10/700,353, filed on Nov. 3, 2003, now Pat. No. 7,657,485.

(60) Provisional application No. 60/422,942, filed on Nov. 1, 2002.

(51) Int. Cl.
*H04M 15/00* (2006.01)

(52) U.S. Cl.
USPC .................. 379/114.04; 379/114.03; 455/406

(58) Field of Classification Search
USPC .......................... 379/114.01–114.12; 455/406
See application file for complete search history.

(56) References Cited

U.S. PATENT DOCUMENTS

| | | | |
|---|---|---|---|
| 5,659,593 A * | 8/1997 | Tzvieli | ........................... 379/13 |
| 5,768,284 A * | 6/1998 | Cox | ........................ 379/114.04 |
| 5,802,156 A | 9/1998 | Felger | |
| 5,822,414 A | 10/1998 | Reding et al. | |
| 6,032,132 A | 2/2000 | Nelson | |
| 6,240,167 B1 | 5/2001 | Michaels | |
| 6,522,734 B1 | 2/2003 | Allen et al. | |
| 6,798,871 B2 * | 9/2004 | Richardson | .............. 379/114.04 |
| 6,912,382 B2 | 6/2005 | Fellenstein et al. | |
| 6,975,208 B2 | 12/2005 | Zai | |
| 7,283,624 B1 | 10/2007 | Meek et al. | |
| 2002/0082991 A1 * | 6/2002 | Friedman et al. | ............... 705/40 |

(Continued)

FOREIGN PATENT DOCUMENTS

EP 790714 A2 8/1997

OTHER PUBLICATIONS

"Your Home Long Distance Connect With the Right Company", Changing Times (1986-1991); Feb. 1986; 40,2; ABI/INFORM Global, p. 37.

(Continued)

*Primary Examiner* — Joseph J Nguyen
(74) *Attorney, Agent, or Firm* — Perkins Coie LLP (57) ABSTRACT

A system, method, apparatus, and computer program code for identifying billing discrepancies includes receiving billing data from a billing entity, the billing data including an assessed fee and call details associated with each of a plurality of calls made by a customer, identifying, based at least in part on the call details received from the billing data, rate information associated with the customer, generating an expected tee for each of the plurality of calls, and comparing, for each of the plurality of calls, the expected fee with the assessed fee to identify discrepancies.

20 Claims, 5 Drawing Sheets

(56) References Cited

U.S. PATENT DOCUMENTS

2002/0129039 A1 9/2002 Majewski et al.
2003/0036918 A1 2/2003 Pintsov
2003/0220093 A1 11/2003 Fellenstein et al.
2004/0081302 A1 4/2004 Kim et al.

OTHER PUBLICATIONS

Bruce Mohl and Patricia Wen, "Customers Relate Credit-Card Company Service Woes", Globe Staff. Boston Globe. Boston, Mass.: Oct. 24, 1999. p. B.2.

\* cited by examiner

SAMPLE BILLING
DATA
500

| BILLING ENTITY IDENTIFIER 502 | CUSTOMER ENTITY IDENTIFIER 504 | TRANSACTION NUMBER 506 | TRANSACTION TIME 508 | BILLED AMOUNT 510 |
|---|---|---|---|---|
| ATT001 | GS0001 | 34509325 | 01202002 134532 | 400.65 |
| MCI043 | GS0001 | 61500225 | 01212002 160159 | 1010.82 |
| VER020 | GS0001 | 39910341 | 01212002 231100 | 54.10 |
| SPR900 | GS0001 | 10183679 | 01222002 003624 | 234.99 |

FIG. 4

SAMPLE
CUSTOMER
DATA
— 600

| BILLING ENTITY IDENTIFIER 602 | TRANSACTION NUMBER 604 | TRANSACTION TIME 606 | EXPECTED CHARGE 608 |
|---|---|---|---|
| ATT001 | 34509325 | 01202002 134532 | 10.23 |
| MCI043 | 61500225 | 01212002 160159 | 45.91 |
| VER020 | 39910341 | 01212002 231100 | 2.60 |
| SPR900 | 10183679 | 01222002 003624 | 19.01 |

FIG. 5

SYSTEM AND METHOD FOR IDENTIFYING BILLING ERRORS

CROSS REFERENCE TO RELATED APPLICATIONS

The present application is a continuation of U.S. patent application Ser. No. 12/638,869, filed Dec. 15, 2009, entitled "System and Method For Identifying Billing Errors," now allowed; which is a continuation of U.S. patent application Ser. No. 10/700,353, filed Nov. 3, 2003, entitled "System and Method For Identifying Billing Errors," issued as U.S. Pat. No. 7,657,485 on Feb. 2, 2010; which claims priority benefit under 35 U.S.C. §119 of U.S. Provisional Application No. 60/422,942, filed Nov. 1, 2002, all of which are incorporated herein by reference in their entirety.

FIELD

The present invention relates to a system and method for identifying billing errors.

BACKGROUND

Companies and other entities (generally referred to herein as "customers") are heavily dependent upon telecommunications services. A typical customer may purchase telecommunications services from one or more service providers. Each service provider may offer a variety of service plans, each having different rate schedules depending on different characteristics of individual communications. As an example, a customer may purchase international long distance services from a service provider, and may have some rates for certain types of calls negotiated by agreement in a rate schedule. Other types of calls may have rates that are specified in service guides or rate tables published by the service provider. A typical large customer's relationship with such a service provider may involve 50 or more rate schedules.

Further, a customer may have a large number of different accounts (e.g., associated with different divisions or groups within the company), where each account is responsible for paying for its associated telecommunications charges. Many large companies have hundreds of different accounts. Each account may include dozens of individual telephones or calling cards, each of which may be involved in calls subject to the customer's contract with the telecommunications service provider. The customer may pay thousands (or even hundreds of thousands) of dollars each month for the telecommunications services. The total bill is calculated based on the services providers' application of the rate schedules to each individual call. Unfortunately, many (if not most) bills are inaccurate. A seemingly minor misapplication of a rate schedule that assesses an extra dollar to certain types of calls can result in an overall error totaling hundreds or thousands of dollars.

Billing discrepancies often occur and are difficult to identify, particularly where the calculation of billing rates is complex. Many customers lack either the resources or the expertise to identify such billing errors, and therefore often overpay for services. Further, even when a customer is able to identify an error or discrepancy, it can be difficult for the customer to prove the error or discrepancy to the service provider with sufficient detail to secure a refund or credit.

SUMMARY

Embodiments provide a system, method, apparatus, and computer program code for identifying billing discrepancies, including receiving billing data from a billing entity, the billing data including an assessed fee and call details associated with each of a plurality of calls made by a customer, identifying, based at least in part on the call details received from the billing data, rate information associated with the customer, generating an expected fee for each of the plurality of calls, and comparing, for each of the plurality of calls, the expected fee with the assessed fee to identify discrepancies.

Pursuant to some embodiments, processing further includes analyzing the discrepancies to identify if the discrepancy is based on a billing error. Pursuant to some embodiments, a set of billing discrepancies which are based on billing errors are generated and provided to the billing entity for resolution. Pursuant to some embodiments, information may be provided which indicates a potential source of each billing error. Pursuant to some embodiments, information which indicates a potential source may include information identifying whether the error appears to have a time-based component and whether the error appears to have a fixed-fee component.

DETAILED DESCRIPTION

Figure 1:
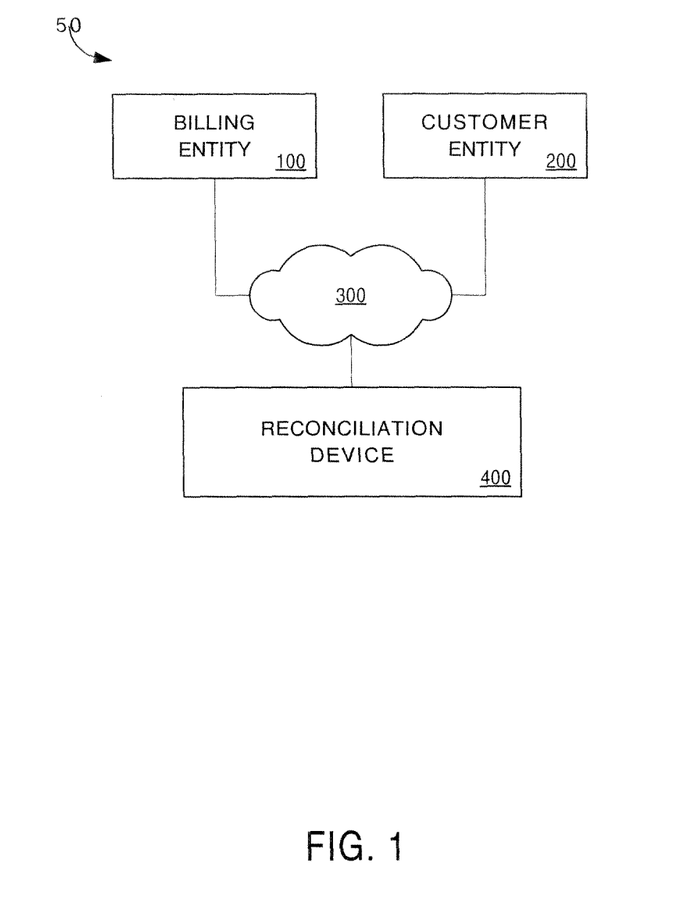
FIG. 1 is a block diagram representing a reconciliation system according to one embodiment of the present invention.

FIG. 1 shows a reconciliation system 10 according to some embodiments. In the embodiment depicted, the reconciliation system 50 includes a billing entity 100, a customer entity 200, and a reconciliation device 400. As depicted, the entities communicate through a network 300, which may consist of any available communications method and/or protocol, such as the Internet, fiber-optic, cable, or telephone connections, or satellite or radio frequency. The reconciliation device 400 may be a part of (or operated by or on behalf of) the customer entity 200, a branch, affiliate, subsidiary, partner, or unit of the customer entity 200.

In some embodiments, the reconciliation device 400 may be operated by an entity or entities separate from customer entity 200 (e.g., acting as a service provider on behalf of one or more customer entities) In either configuration, one or more customer entities 200 may interact with reconciliation device 400 to identify billing errors or inaccuracies based on bills or invoices generated by billing entity 100.

The reconciliation device 400 may also be a branch, affiliate, subsidiary, partner, or unit of the billing entity 100, where the billing entity 100 would use the reconciliation device 400 to prevent undetected billing errors, reducing the potential liability of billing entity 100. The billing entity 100 may be any number of service or product providers, retailers, or wholesalers. The customer entity 200 may be any number of service or product subscribers or users that exchange money and/or other consideration with the billing entity 100.

Figure 2:
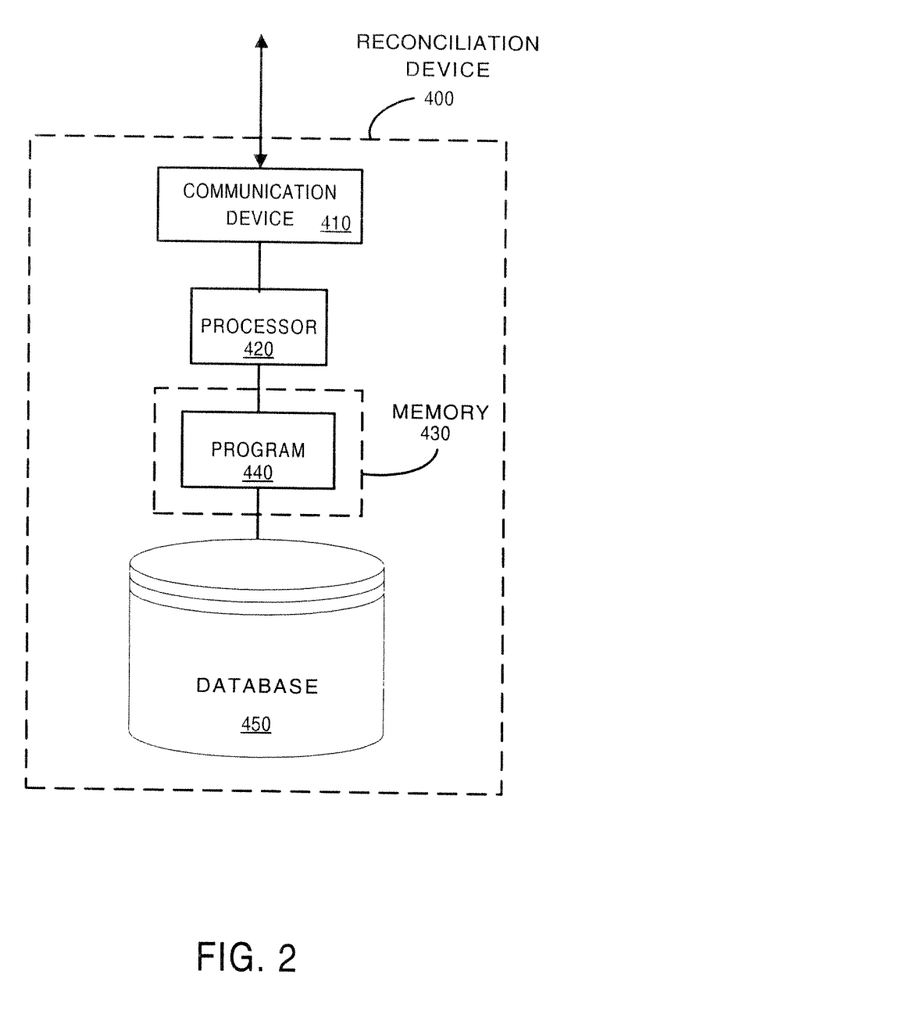
FIG. 2 is a block diagram representing a reconciliation device according to one embodiment of the present invention.

FIG. 2 illustrates a typical structure of the reconciliation device 400, according to one embodiment of the invention. The reconciliation device 400 can be any available computerized device, such a device consisting of (1) a communication device 410 for interacting with both the billing entity 100 and the customer entity 200, (2) a processor 420 for executing stored program code, (3) memory 430 in which to store program code, (4) program code 440, configured pursuant to embodiments, to identify billing errors, and (5) a database 450 for storing billing and customer data. The reconciliation device 400 may be a single unit or a series of multiple units with functionality dispersed amongst the separate devices.

Figure 3:
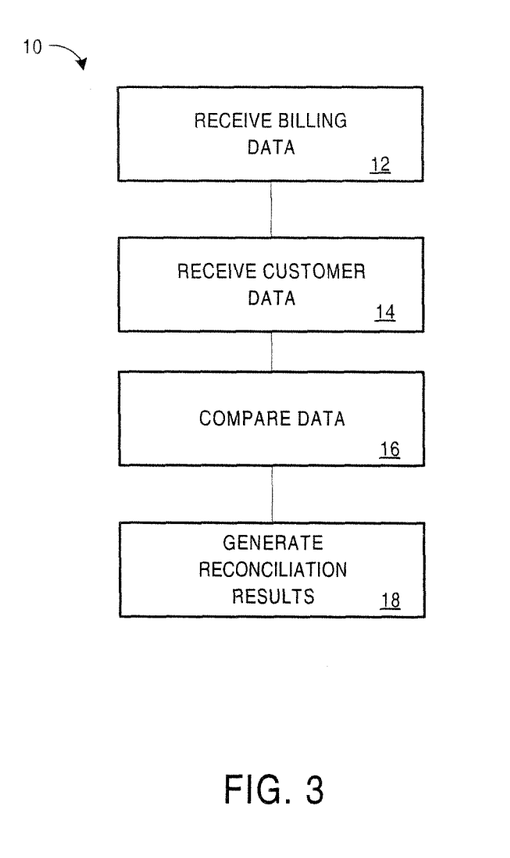
FIG. 3 is a flow diagram illustrating an exemplary process of identifying billing errors according to one embodiment of the present invention.

FIG. 3 illustrates an exemplary process 10 for identifying billing errors, according to an embodiment of the invention. In some embodiments, some or all of the process steps may be performed by (or under the control of, or in conjunction with) the reconciliation device 400 described in conjunction with FIG. 2. Process 10 begins at 12 with the receipt of billing data (e.g., such as the billing data 500 shown in FIG. 4 and discussed further below). For example, processing at 12 may include receiving a billing data file from a service provider or other billing entity (such as entity 100 of FIG. 1). This billing data file may be received electronically or may be provided in physical form and scanned or otherwise converted into electronic form in conjunction with processing at 12. Processing at 12 may be performed on a regular basis (e.g., on a monthly basis or the like) when a service provider submits a bill. Billing data may be received from one or more service providers.

In some embodiments, billing data may include three general types of information: (1) call details, (2) rate information, and (3) the assessed fee for each call. Call details may include information identifying details associated with each call made from telephone numbers of the customer or using calling cards issued to the customer. For example, call details may include information identifying each call made during the billing period, the customer number used in the call, the number called, the nature of the service (e.g., whether the call was placed as a switched call, as a calling card call, etc.), whether the call was made during a peak or off-peak period, the duration of the call, etc.

Rate information may be included in billing data (although some service providers may not provide the rate information in billing data). Rate information included in the billing data may include an identification of the rate schedule and rates applied to each individual call. For example, a set of billing data produced by AT&T may reference the AT&T rate schedule applied to a particular call (such as one of the rate schedules published by AT&T at www.serviceguide.att.com). A set of billing data may also reference rates specified by a particular service agreement in force between a customer and a service provider. Billing data also includes an assessed fee for each call. The assessed fee for each call is generally shown as a dollar amount.

Processing continues at 14 where customer data is received or identified. For example, processing at 14 may include operation of reconciliation device 400 to identify, receive, or retrieve a file (or files) of customer data (such as the data shown in customer database 600 of FIG. 5). This customer data may include some data that is based on or identical to the billing data received at 12. For example, in one embodiment, portions of billing data received from a service provider are used to generate customer data. As a specific example, processing at 14 includes extracting or parsing certain information from the billing data received at 12. In particular, in some embodiments, processing at 14 may include extracting or parsing call details from the billing data. These call details are used to generate a table of customer data which is then used to independently calculate the expected fee associated with each call. For example, a customer database or table may be generated which includes all of the call details identified by the billing entity in the billing data received at 12. Processing at 14 may further include generating or identifying information identifying an expected rate schedule associated with each call, and then generating an expected fee associated with each call.

For example, the expected rate schedule associated with each call may be retrieved from a separate file or set of files maintained by (or on behalf of) the customer. As described above, a typical customer may have a large number of potential rates associated with the services that it receives from each service provider. Tracking and identifying all of these rates can be very complex. As a result, pursuant to some embodiments, a separate file or set of files is maintained and updated each time a new rate is imposed or each time a rate is modified. Each rate may be associated with information identifying the circumstances under which the rate applies (e.g., a particular rate may apply for all international calling card calls placed during peak hours). By maintaining a separate file or set of files including all current rate schedules applicable, a customer may readily apply the relevant rates to the call details extracted from the billing data to identify an expected fee associated with each call.

In some embodiments, upon completion of processing at 14, a database or set of customer data is generated which includes (1) the individual call details extracted from the billing data received at 12, (2) the expected rate schedule applicable to each call, and (3) a customer-generated expected fee associated with each call.

Figure 4:
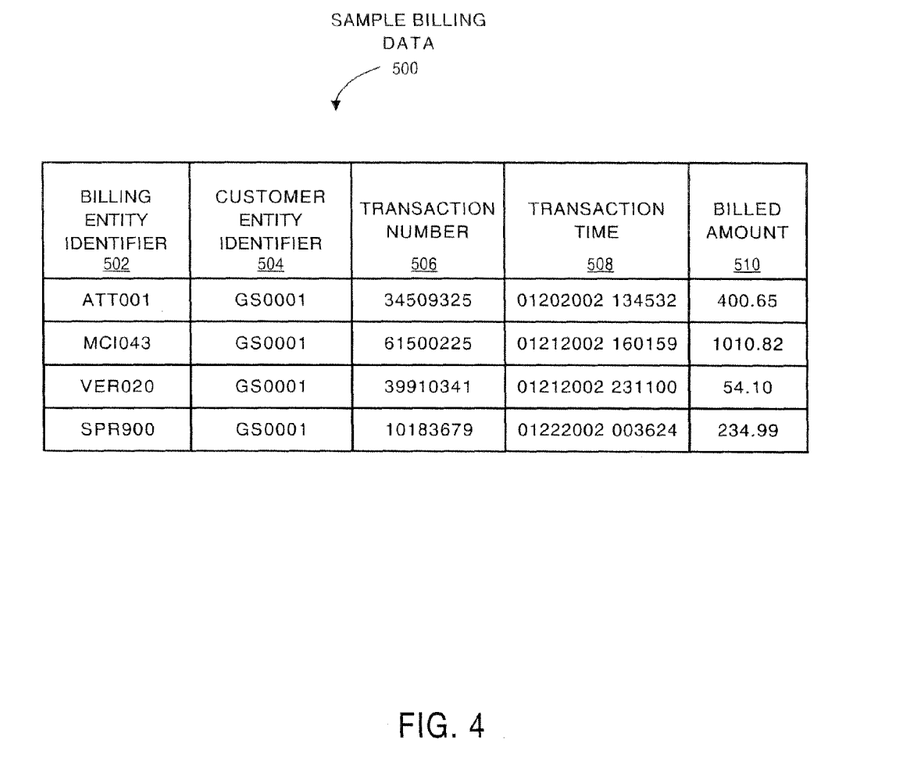
FIG. 4 is a database table diagram illustrating an exemplary structure of a billing data database according to one embodiment of the present invention.
Figure 5:
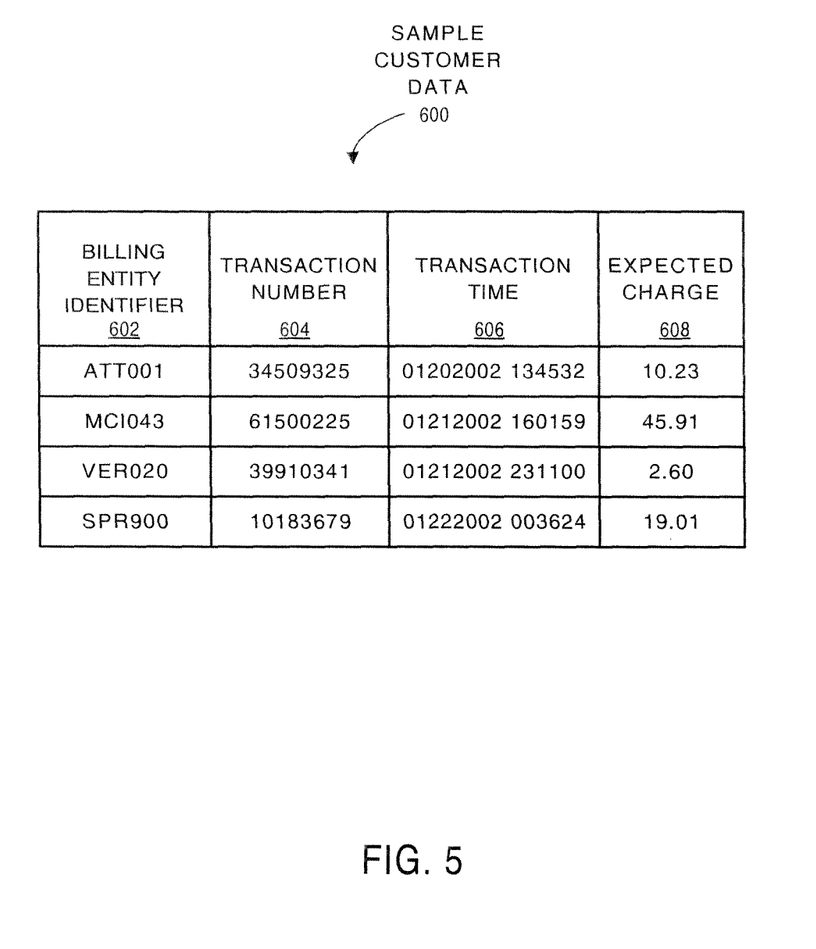
FIG. 5 is a database table diagram illustrating an exemplary structure of a customer data database according to one embodiment of the present invention.

Processing continue at 14 where data is compared. For example, reconciliation device 400 may be operated to compare the customer data (e.g., from the customer database 600) with the billing data (e.g., from the billing database 500) to identify any potential discrepancies. For example, the reconciliation device 400 may be operated to compare the data sets by identifying records in both data sets that represent a single transaction, and matching those records. The identification process may utilize any number of data fields that are common between the two data sets to identify unique transactions.

Once the records in both data sets are matched, the reconciliation device 400 analyzes the matched records to locate discrepancies. If each field in both matched records for a single transaction is identical, then no discrepancy exists for that transaction. If any field is not identical, then a discrepancy exists. The reconciliation device 400 then generates a set of reconciliation results at 18. The reconciliation results may contain records with identified errors and/or summaries of the identified discrepancies, such as the total dollar value of overcharged billings. In some embodiments, the reconciliation results are primarily intended to identify differences between the assessed or billed fee for a call (from billing database 500) and the customer-calculated expected charge for the call (from customer database 600), however, those skilled in the art will appreciate that embodiments may be used to identify other discrepancies.

Processing at 18 may further include performing additional analyses once a discrepancy has been identified. For example, many telecommunications service providers assess two general types of tees for calls: fixed fees and time-based fees. Embodiments allow a customer to perform additional analyses to identify the type of fee which is likely the source of a billing discrepancy. For example, in some embodiments, a table or database of discrepancies may be generated as a result of processing at 18. A number of queries may be run against this table or database of discrepancies to characterize the nature of some or all of the discrepancies. Some of the discrepancies, for example, may be identified as having a time variance. As a specific example, queries may be run against the call details associated with the calls having discrepancies which are designed to determine if the overall charge for the calls varies (or does not vary) based on the length of each of the calls. If the proportion does not vary, the discrepancy may be characterized as one that resulted from the misapplication of a time dependant charge. This information about the nature of the discrepancy may be communicated to the billing entity in order to negotiate a correction in the bill.

Other queries and analyses may be performed to identify discrepancies that likely result from misapplication of fixed charges. For example, queries that identify consistent error amounts in similar types of calls may identify fixed charge errors. Other queries may be established to identify discrepancies that are not the result of billing errors. For example, some service providers assess a fixed charge to all calls placed from public pay telephones. The pay telephone fixed charge may be, for example, $0.49. A query may be run to identify all discrepancies which involve a difference of approximately $0.49 between the expected charge and the billed amount to identify calls which were likely placed from a public pay telephone. In this manner, a customer can ensure that it seeks correction only for those calls which actually involve an unexplained discrepancy, thereby improving the customer's chances of receiving a billing correction or credit.

FIG. 4 shows a representative database table structure for storing billing data 500, according to one embodiment of the invention. The billing data 500 may contain multiple data fields representing the information the billing entity 100 maintains in association with the transactions that occur between the billing entity 100 and the customer entity 200. FIG. 4 shows a billing entity identifier 502, which identifies a specific billing entity (which may be useful, for example, where the reconciliation device 400 receives data from a plurality of billing entities), a customer entity identifier 504, which similarly identifies individual customer entities (which may be useful, for example, where the reconciliation device 400 receives data from a plurality of customer entities, as in where the reconciliation device 400 operates as a third-party reconciliation service provider), a transaction number 506 that uniquely identifies each transaction between the billing entity 100 and the customer entity 200, a transaction time 508 that shows the date and time the transaction occurred, and a billed amount 510, which shows how much the billing entity 100 charged the customer entity 200 (the "assessed fee") for the given transaction. The billing data 500 may contain any number of other associated data fields that could be useful for analyzing the particular transaction type being considered. For example, as discussed above, in some embodiments billing data 500 also includes call details and rate information as well as the assessed fee.

FIG. 5 shows a representative database table structure for storing customer data 600, according to one embodiment of the invention. The customer data 600 may contain multiple data fields representing information the billing entity 100 maintains in association with the transactions that occur between the billing entity 100 and the customer entity 200. FIG. 5 shows a billing entity identifier 602, which identifies a specific billing entity (particularly useful where the reconciliation device 400 receives data from a plurality of billing entities), a transaction number 604 that uniquely identifies each transaction between the billing entity 100 and the customer entity 200, a transaction time 606 that shows the date and time the transaction occurred, and an expected charge 608, which shows how much the customer entity 200 expects to be charged for the given transaction. The expected charge 608 may either be calculated by the customer entity 200 prior to the reconciliation device 400 receiving the billing data 500, or the customer data 600 may contain enough rate and billing information so that the reconciliation device 400 may calculate the expected charge 608 after it receives the billing data 500. The customer data 600 may also contain any number of other associated data fields that could be useful for analyzing the particular transaction type being considered. As discussed above, customer data 600 may also contain call details (e.g., which may be extracted or parsed from billing data 500) and rate tables or rate information compiled by the customer.

If the billing entity 100 is a long-distance telephone and/or phone card service provider, for example, the billing data 500 may contain fields such as rate type, rate description, call charge, call service type, access type, origination country code, origination phone number, destination country code, destination phone number, total call minutes, additional call seconds, air mileage and mileage band codes. The call charge field may be the sum of an access charge, a variable cost for an initial billing period in seconds, a variable cost for subsequent time charge increments, a charge per minute, a fixed per call charge and variable per call or per time period surcharges. The customer data 600 may contain many of the identical fields that the billing data 500 contains, but would be lacking the actual charge information imposed by the billing entity 100.

The customer information 600 may be associated with a known algorithm, set of formulas, or method to compute the appropriate charge expected 608 to be imposed by the billing entity 100. In the case of the example, international calling card data for given telephone calls made by a particular customer would be used to calculate an expected charge per minute for each call. The reconciliation device 400 could accomplish this, or it could be pre-calculated by the customer entity 200. The resultant expected charge 608 data would then be compared to the actual billed amount 510 data received from the telephone company, for each given telephone call. Any identified discrepancies could be marked for further analysis and/or aggregated to determine a total net loss or gain from the billing inaccuracies. The discrepancy information could then be provided to either or both of the telephone company and the customer. Where the reconciliation device acts as a third-party reconciliation service provider, the underpaying or overcharging party can then be billed for the error. Funds can then also be received from the appropriate entity and transferred to the other entity.

Details of a particular application of embodiments of the present invention will now be discussed. In the example, embodiments are utilized to identify and correct errors in a long-distance company's billing. In the example, reconciliation device 400 and customer entity 20 are operated by the same entity (e.g., the customer who has been subjected to errors in bills received from its long-distance company).

Due to the nature of a long-distance company's international billing platform, errors in billing are obscure, difficult to identify, and difficult to prove. In the example, the customer utilizes services of the long-distance company to make international calls. The long-distance company may establish particular rates for the customer. For example, the long-distance company may establish rate schedules that apply to international calling cards used by the customer. For example, calls made by the customer from Mexico to the United States can be very complicated. The rate table may specify that the calls be billed as follows: (1) there is an $0.80 "Type II Authorization Call Charge", which is a per call, calling card surcharge, (2) a $0.004 "Type II Switched Access Charge" billed per six (6) second increment of call time, (3) a variable cost for the initial thirty (30) seconds of the call, which is determined based upon a mileage factor (represented by Bands 1-10), and billed at either a Standard, Discount or Economy rate determined by the connect time of the call, (4) a variable cost for each six (6) second interval after the initial thirty (30) seconds based on the same mileage Bands as the variable initial thirty (30) second charge and the rate period (Standard, Discount or Economy) in which the increment occurred and (5) a variable "Point of Connection" charge based on the same mileage Bands.

Dividing the total cost of a call by the length of the call yields an average cost per minute. Inconsistent costs per minute may show that some calls are billed at $23.66 per minute, when the correct charge should have been $2.60 per minute. A 47.4 minute call billed at the incorrect rate produces an overcharge to the customer of $998.24. Larger customers that make many such international calls under an incorrect billing scenario can easily lose $8,000 to $9,000 per month. Applicants have discovered that billing errors capable of producing such errors can occur in multiple ways. One example of a potential billing error is that an incorrect entry is made in the rate table itself. The timing indicators in the rate table may be incorrectly set at 30 and 6, as opposed to 60 and 60 (full-minute rating), for example. This error causes customers that are supposed to be billed $2.34 per minute to be charged $2.34 for the first thirty (30) seconds, and $2.34 for each additional six (6) seconds thereafter. Calls that should be charged $2.34 for Point of Connection are instead charged $14.40, with each additional minute costing $23.40. Similar incorrect entries in rate tables may cause more random and less easily identifiable errors. These errors are difficult to identify and even more difficult to prove to a long-distance carrier not receptive to paying back customers large sums of money.

Embodiments of the present invention may be utilized to avoid such errors. For example, the errors may be caught early enough to prevent significant problems, and identified more precisely to facilitate remedial payments. For example, billing data 500 long-distance company may be received by the reconciliation device 400, from a billing entity 100. The billing data 500 may include the total billed amount 510, $1,110.80 (as an example) total call length (47.4 minutes in the example), and call identification data 502-508 for at least one call made by the customer entity 200. Customer data 600 is then received by the reconciliation device 400, from the customer entity 200. The customer data 600 contains at least the total call length (in the example, 47.4 minutes) call identification data 602-606, and either a pre-computed expected charge data 608, $10.20, or sufficient data to calculate the expected charge data 608. The reconciliation device 400 then compares the total billed amount 510, $1,110.80, to the expected charge 608, $10.20. The discrepancy is recorded and reported to the appropriate entity for reconciliation of payment. In this example, the long-distance carrier may be charged $1,100.60, and payment would be remitted to the customer.

A further example illustrating features of some embodiments will now be provided. As discussed above, many telecommunications service providers offer a wide and complex array of service plans and rates. The rates applicable to a customer may be determined by reference to both a set of published rates and to the terms of any agreement between the customer and the service provider. This complexity often leads to billing errors which can be very difficult to identify and assess. Embodiments allow a customer to generate a set of expected fees for comparison to the assessed fees to identify discrepancies. In some embodiments, a customer establishes and maintains a set of current applicable rates based on published rates and based on rates specified in its service contract. This set of current applicable rates is used to generate customer data and to generate an expected fee for each call.

In the further illustrative example, the service provider's published rate table indicates that outbound international calls made to numbers are governed by rates in Schedules A and B, unless otherwise explicitly stated in a customer's service agreement and unless the calls are made to numbers governed by rates in Schedules X, Y, and Z. In the illustrative example, the customer may have negotiated a service agreement that specifies, for certain outbound international calls that otherwise would have been governed by Schedules A or B, a customer rate table "C". Rate table C may specify that Singapore and Brazil are included in rate table C.

When billing data is received from the billing entity, the customer may parse or extract the call details from the billing data. The call details may then be used by the customer to identify the rate information the customer believes is applicable. This identification may be performed by comparing the call details to a database or set of rate information maintained by the customer (e.g., based on the published rate schedules and based on the contract rate information). An expected fee can then be calculated for each call included in the call details.

In the illustrative example, two calls are included in the call details. A 0:42 call from the U.S. to Singapore and a 1:18 call from the U.S. to Brazil. The billing entity assessed fees of $2.04 and $1.93, respectively. The customer may independently calculate the expected fee by first identifying that the two calls should be governed by the rates in rate table C, and then by applying the rates of rate table C to the call details. For example, rate table C may indicate that the call to Singapore be calculated using a time-based fee of 0.077 and a fixed fee of 0.080 for a total expected fee of $0.88. Similarly, calculations may show that the call to Brazil should have been calculated as a 0.234 time-based fee and a fixed fee of 0.80 for a total expected fee of $1.05. The customer may then compare the expected tee to the billed fee to identify a discrepancy between the two tees. Further processing may be performed to determine whether the discrepancies are errors that should be disputed with the billing entity.

Embodiments have been described with respect to several embodiments. Those skilled in the art will recognize that various substitutions and alternatives in the embodiment described herein would not depart from the spirit and scope of the present invention.

We claim:

1. A system for identifying communication billing discrepancies, comprising:
   a memory containing computer-executable instructions; and
   a processor configured to execute the instructions to:
   receive information associated with a plurality of calls made using a service provider, the information including call details for each of the plurality of calls and a billed charge for each of the plurality of calls;
   determine a first set of the plurality of calls to which a service contract rate agreement with the service provider applies;
   determine a second set of the plurality of calls to which a set of published rates applies;
   calculate an expected charge for each of the calls in the first set by applying the service contract rate agreement to the calls of the first set using the call details;

calculate an expected charge for each of the calls in the second set by applying the published rates to the calls of the second set using the call details;

determine charge discrepancies for the calls by comparing the expected charges for the first set of the calls and the expected charges for the second set of the calls to the billed charges for the calls; and generate a reconciliation report for the plurality of calls based on the charge discrepancies and the call details.

2. The system of claim 1 wherein the processor further executes the instructions to:

generate a net billing discrepancy for the plurality of calls based on the charge discrepancies;

include the net billing discrepancy in the reconciliation report; and transmit the reconciliation report to the service provider.

3. The system of claim 1 wherein the processor further executes the instructions to:

determine at least one type of billing error based on the charge discrepancies, the call details, and at least one of: the service contract rate agreement or the set of published rates; and include the at least one type of billing error in the reconciliation report.

4. The system of claim 3 wherein to determine the at least one type of billing error includes to determine at least two types of billing errors.

5. The system of claim 4 wherein the at least two types of billing errors include a time dependent charge error and a fixed rate charge error.

6. The system of claim 1 wherein the call details for each call include a calling location of the call, a destination of the call, a duration of the call, a phone number used in the call, and a time when the call was placed.

7. The system of claim 1 wherein the processor further executes the instructions to:

store the charge discrepancies in a discrepancy database; and identify an error in an expected rate schedule based on the discrepancy database.

8. The system of claim 1 wherein the processor further executes the instructions to analyze differences between the expected charges and the billed charges to identify a pattern associated with a known surcharge.

9. The system of claim 1 wherein to calculate the expected charge for a call includes to calculate a cost per minute for the call.

10. The system of claim 6 wherein to calculate the expected charge for the call includes to sum a flat fee for the call and a variable fee for the call, wherein the variable fee is based on the duration of the call.

11. A computer-implemented method for identifying communication billing discrepancies, the method comprising:

receiving information associated with a plurality of calls made using a service provider, the information including call details for each of the plurality of calls and a billed charge for each of the plurality of calls;

determining a first set of the plurality of calls to which a service contract rate agreement with the service provider applies;

determining a second set of the plurality of calls to which a set of published rates applies;

calculating an expected charge for each of the calls in the first set by applying the service contract rate agreement to the calls of the first set based on the call details;

calculating an expected charge for each of the calls in the second set by applying the published rates to the calls of the second set based on the call details;

determining charge discrepancies for the calls by comparing the expected charges for the first set of the calls and the expected charges for the second set of the calls to the billed charges for the calls; and generating a reconciliation report for the plurality of calls based on the charge discrepancies and the call details.

12. The method of claim 11 further comprising:

generating a net billing discrepancy for the plurality of calls based on the charge discrepancies;

including the net billing discrepancy in the reconciliation report; and transmitting the reconciliation report to the service provider.

13. The method of claim 11 further comprising:

determining at least one type of billing error based on the charge discrepancies, the call details, and at least one of: the service contract rate agreement or the set of published rates; and including the at least one type of billing error in the reconciliation report.

14. The method of claim 13 wherein determining the at least one type of billing error includes determining at least two types of billing errors including at least a time dependent charge error and a fixed rate charge error.

15. The method of claim 11 wherein the call details for each call include a calling location of the call, a destination of the call, a duration of the call, and a time when the call was placed.

16. The method of claim 11 further comprising:

storing the charge discrepancies in a discrepancy database; and identifying an error in an expected rate schedule based on the discrepancy database.

17. The method of claim 11 further comprising analyzing differences between the expected charges and the billed charges to identify a pattern associated with a known surcharge.

18. The method of claim 11 wherein calculating the expected charge for a call includes calculating a cost per minute for the call.

19. The method of claim 11 wherein calculating the expected charge for the call includes summing a flat fee for the call and a variable fee for the call, wherein the variable fee is based on a duration of the call.

20. A non-transitory computer-readable medium comprising computer-executable instructions that, when executed by at least one computer processor, direct the at least one computer processor to:

receive information associated with a plurality of calls made using a service provider, the information including call details for each of the plurality of calls and a billed charge for each of the plurality of calls;

determine a first set of the plurality of calls to which a service contract rate agreement with the service provider applies;

determine a second set of the plurality of calls to which a set of published rates applies;

calculate an expected charge for each of the calls in the first set by applying the service contract rate agreement to the calls of the first set using the call details;

calculate an expected charge for each of the calls in the second set by applying the published rates to the calls of the second set using the call details;

determine charge discrepancies for the calls by comparing the expected charges for the first set of the calls and the expected charges for the second set of the calls to the billed charges; and generate a reconciliation report for the plurality of calls based on the charge discrepancies and the call details.

\* \* \* \* \*